United States Patent
Mungalsingh

(10) Patent No.: US 10,479,891 B1
(45) Date of Patent: Nov. 19, 2019

(54) THREE METHODS TO PROCESS TRINIDAD NATURAL ASPHALT

(71) Applicant: Anand Mungalsingh, Maraval (TT)

(72) Inventor: Anand Mungalsingh, Maraval (TT)

( * ) Notice: Subject to any disclaimer, the term of this patent is extended or adjusted under 35 U.S.C. 154(b) by 119 days.

(21) Appl. No.: 15/041,362

(22) Filed: Feb. 11, 2016

(51) Int. Cl.
*C08L 95/00* (2006.01)
*C09D 195/00* (2006.01)

(52) U.S. Cl.
CPC .............. *C08L 95/00* (2013.01); *C08L 95/005* (2013.01); *C09D 195/00* (2013.01)

(58) Field of Classification Search
CPC ............................... C08L 95/00; C09D 195/00
USPC ................................................ 106/273.1–281
See application file for complete search history.

(56) References Cited

U.S. PATENT DOCUMENTS

| | | | | |
|---|---|---|---|---|
| 4,560,414 A * | 12/1985 | Kikegawa | ............... | C08L 95/00 106/284.01 |
| 5,328,943 A * | 7/1994 | Isobe | ....................... | C08L 95/00 524/68 |
| 6,277,904 B1 * | 8/2001 | Nicholas | ............... | C08L 101/00 152/151 |
| 6,558,462 B1 * | 5/2003 | Nicholas | ................. | C08L 95/00 106/281.1 |
| 7,202,290 B2 * | 4/2007 | Stuart, Jr. | ............... | C08L 95/00 524/68 |
| 8,852,332 B2 * | 10/2014 | Nicholas | ............... | C08K 3/346 106/284.02 |
| 9,382,423 B2 * | 7/2016 | Bolton | .................... | C08L 95/00 |

\* cited by examiner

*Primary Examiner* — Nina Bhat

(57) ABSTRACT

The world's natural asphalts are thermoplastic and coalescent in nature. After removing its water content, the resulting refined asphalts flow, coalesce, its mineral matters sediment when used in blends, and therefore could only be used with specialized road-paving equipment. Three methods are presented here to solve these problems. Method One gives a new way of packaging the natural and refined asphalts in pellet-form. Method Two uses water surface to stop the pellets of natural or refined asphalts from coalescing. Method Three uses water to blend the natural or refined asphalts, producing powders and pellets which do not flow or coalesce. In all methods, the processed asphalts are packaged for use on conventional road-paving equipment, without loss in performance when compared with the refined asphalts.

2 Claims, No Drawings

THREE METHODS TO PROCESS TRINIDAD NATURAL ASPHALT

CROSS-REFERENCE TO RELATED APPLICATIONS

Not Applicable.

BACKGROUND OF THE INVENTION

1. Introduction (a) The natural asphalt found at La Brea, Trinidad, West Indies, is known as Trinidad Natural Asphalt, or TNA. When the water in TNA is removed, refined Trinidad Lake Asphalt, or TLA, is obtained. Both TNA and TLA are thermoplastic in nature, acting as both a solid and a liquid. TNA and TLA are also coalescent in nature, so that the discrete elements of TNA or TLA easily coalesce. For many decades, this form of TLA is packaged in silicone-coated hardboard kegs, and this practice continues today.

(b) The natural asphalt found at Guanoco Lake, Sucre State, Venezuela, is known as Venezuela Natural Asphalt, or VNA. When the water in VNA is removed, refined Venezuela Lake Asphalt, or VLA, is obtained. Through the last few years of production, this form of VLA was packaged in wooden barrels coated with releasing agents.

Like TNA and TLA, VNA and VLA are also thermoplastic and coalescent in nature.

(c) There are other natural asphalts available worldwide with a composition of water, bitumen and mineral matter, and which are also thermoplastic and coalescent in nature, and these asphalts are here termed NNA. When the water in NNA is removed, a refined form of the natural asphalts is produced, and this form is here termed as refined Natural Lake Asphalt, or NLA.

2. The Clarifications (a) These deposits of natural asphalts available worldwide, which are thermoplastic and coalescent in nature, are not to be confused with the world's many deposits of tar sands, or tar pits. The compositions of natural asphalts and tar sands/tar pits are very different, and so too are the uses;

(b) The word 'asphalt' in this patent refers to the material found in natural asphaltic deposits worldwide, and do not refer to the asphalt or bitumen processed from crude oil at refineries;

(c) Further, the natural asphalts found in deposits which are thermoplastic and coalescent in nature, like TNA or VNA or NNA, are referred to in this patent as "natural asphalts".

When the water in the natural asphalts is removed, the resulting products, such as TLA or VLA or NLA, are referred to in this patent as "refined asphalts".

When the natural or refined asphalts are packaged, or packaged with surface water, or processed with water as an additive and then packaged, and as is detailed in Sections 4 and 6 below, the resulting products, such as pTNA or pVNA or pNNA, or pTLA or pVLA or pNLA, are all referred in this patent as "processed asphalts"; and (d) The phase "conventional road-paving equipment" in this patent refers to all road-paving equipment which do not include specialized heated tanks with stirrers to handle natural or refined asphalts.

3. The Compositions of Two Natural Asphalts (i.e. TNA and VNA) by Weight are The compositions of TNA and VNA (as found in the deposits) are:

(a) TNA: Water: 30%, bitumen: 40%, mineral matter: 30%.

(b) VNA: Water: 15%, bitumen: 77%, mineral matter: 8%.

This composition of VNA varies slightly throughout the deposit.

4. The Chemistry of Two Refined Asphalts (i.e. TLA and VLA) Usually Includes Some chemistry of TLA and VLA (after the water content has been removed) are:

(a) TLA: (by weight) Bitumen: 54%, mineral matter: 46%.

The softening point: 101° C.

(b) VLA: (by weight) Bitumen: 91%, mineral matter: 9%.

The softening point: 106° C.

5. The Characteristics of Natural and Refined Asphalts

These natural asphalts (such as TNA, VNA, and NNA) are thermoplastic in nature (i.e. solids that act like liquids). The higher the temperature, the more fluid these natural asphalts are. These natural asphalts are also coalescent in nature (i.e. discrete elements which easily coalesce).

All the refined asphalts (such as TLA, VLA and NLA) are also thermoplastic and coalescent in nature.

Throughout the decades, some natural asphalts (including TNA and VNA) have been processed by removing the water content, resulting in the refined asphalts (i.e. TLA and VLA). Refined asphalts are the forms usually used.

The two main problems with refined asphalts are:

(a) Packaging: Due to the thermoplastic nature, the discrete elements of refined asphalts flow, and this problem increases with temperature. The smaller the size of the discrete element, the easier the ability to handle and use the elements i.e. the size of the element affect the handing, but not the shape. Therefore, to minimize this flowing problem, the discrete elements of the refined asphalts could be packaged in the smaller sizes, so that when the small elements flow, the packaging, storing, handling, and usage is still allowed.

However, the bitumen content in the refined asphalts causes the bitumen on the surface of the discrete elements of the refined asphalts to easily coalesce. It is this coalescent problem which prevents refined asphalts from being packaged in paper or plastic or fabric bags, but the TLA is packaged in hardboard kegs coated with silicone, and the VLA is packaged in wooden barrels coated with a releasing agent, each in bulk-form containing 250 kg.

This filling process of kegs or barrels is usually done at 163° C., and as there is shrinkage of the refined asphalts on cooling, the kegs or barrels have to be topped-up during a second filling process, thus adding to the refined asphalt's many handling problems.

The keg and barrel containers cause environmental problems when disposed, and are costly to the end-user.

(b) Usage: TLA and VLA have been successfully used as modifiers to significantly improve the performance of refinery bitumen in road-paving mixes for many decades.

The bulk-form of packaging TLA and VLA, each weighing 250 kg, cannot be easily transported via the conveyor belt directly to the drum/pug-mill in conventional road-paving equipment. If the bulk-form of 250 kg is broken into smaller pieces, these smaller pieces will continue to coalesce. The TLA and VLA are therefore difficult to handle. As the TLA or VLA cannot be transported via conveyor belts directly to the drum/pug-mill, the TLA or VLA, like other modifiers, must be separately blended with the refinery bitumen, and then the blend stored until being pumped to the drum/pug-mill for mixing with the aggregates.

However, as the density of the mineral matter in the TLA and VLA is higher than that of the contents of refinery bitumen, these mineral matters sediment when the TLA or the VLA is blended with refinery bitumen. Therefore, unlike the other modifiers, specialized heated tanks with stirrers are required to blend the TLA or VLA with the refinery bitumen, and these tanks are then used to store the blend until pumped to the drum/pug-mill for mixing with the aggregates. Further, despite the use of these stirrers, sedimentation still continues, and therefore these blends must be used within determined timeframes. These timeframes, usually about four hours, are determined by the grade of the bitumen, the blend (i.e. asphalt to bitumen ratio), and the characteristics of the tanks and stirrers.

For these reasons, refined asphalts have never been used with the conventional road-paving equipment available worldwide. These specialized equipment have to be used on every site refined asphalts are used, thus increasing the costs to the end-user.

However, if the coalescing problem with these refined asphalts is solved, then the discrete elements of TLA or VLA which are of the smaller sizes could be packaged in paper or plastic or fabric bags, the flowing of the elements would continue, but the TLA or VLA could still be handled and used. The TLA or VLA could then be conveyed directly to the drum/pug-mill in conventional road-paving equipment, and consequently the separate blending process with the refinery bitumen would not be required, and therefore the sedimenting problem would not occur.

The problem therefore is to solve the coalescent problem of the natural or refined asphalts, as the flowing problem could be tolerated, and the sedimenting problem would no longer occur.

The above characteristics (and problems) also apply to all natural asphalts (thermoplastic and coalescent in nature).

All the above characteristics (and problems) also apply to all refined asphalts.

6. The Problems of Using Natural and Refined Asphalts

The two main problems with natural and refined asphalts are detailed in Section 3 Item 5 above.

The transporting, storing, handling and using of these asphalts in such forms are therefore costly to the end-users.

7. Processing and Using TLA or VLA

TLA or VLA have been processed and used in the following manner throughout the decades:
(a) The TNA or VNA is mined;
(b) The water in the TNA (30% by weight) or the VNA (about 15% by weight) is removed using heat (i.e. using high-pressure steam at a temperature of 163° C.). Using an open flame would cause flash problems;
(c) As the discrete elements flow and coalesce, TLA is packaged in silicone-coated hardboard kegs, and the VLA is packaged in wooden barrels coated with releasing agents;

(d) As shrinkage occurs on cooling, the kegs or wooden barrels have to be topped-up during a second filling process. In bulk-form of packaging, each keg or barrel contains 250 kg;
(e) The kegs or barrels are broken on-site to access the refined asphalts. This procedure is hazardous, and the kegs and barrels cause environmental problems when disposed; and
(f) On every site TLA or VLA is used, specialized heated tanks with stirrers are required to keep the mineral matter in these refined asphalts in suspension when blended with refinery bitumen, and despite the use of stirrers, these blends must be used within timeframes determined by the grade of bitumen, the type of blend, and the characteristics of the tanks and stirrers—this timeframe is usually about four hours.

A flowchart of the production and use of TLA or VLA is therefore as follows:

Mining→water removed using steam at 163° C.→filled in coated kegs or wooden barrels→topped up (second filling) →used with specialized heated tanks with stirrers.

8. The Marketing of TLA and VLA (a) Despite all of the above problems, Trinidad Lake Asphalt (i.e. TLA) has been successfully used as a road-paving material since the 1880s. From 1890 to 1969, about twelve million tons of TLA have been used as a road-paving material, with an average of 143,000 tons/year. A significant part of these sales were packaged in coated kegs. The TLA is used as a modifier to enhance the performance of the refinery bitumen when used for road-paving. When TLA is blended with any refinery bitumen, the resulting binder gives superior performance as a road-paving material. For this reason, TLA is known worldwide as one of the premium modifiers available anywhere, having gained decades of goodwill as a successful modifier of refinery bitumen for road-paving. Examples of use could be found on the George Washington Bridge, as well as on the runways at the LaGuardia and JFK Airports in New York City, and at Terminal 3 of the Beijing Capital Airport, which was paved with TLA as a modifier for the 2008 Summer Olympics.

Kegged-TLA continues to be produced and marketed today. However, because of the problems detailed, present annual volumes are much lower than those of pre-1969.

(b) Further, during the period from 1885 to 1934, over one million tons of Venezuela Natural Asphalt were mined and exported to South Amboy, N.J., USA, where the water in the natural asphalt (i.e. VNA) was removed, and then the VLA used as a modifier of refinery bitumen, producing road-paving mixes which were used for paving in the east coast of the USA, including the cities like New York, New Jersey, Philadelphia and Washington D.C.

VNA has not been mined since 1934.

(c) Both TLA and VLA have decades of goodwill of successfully modifying refinery bitumen, increasing the performance of the bitumen. Therefore the performances of TLA and VLA over the decades are the standards to be achieved by all the processed asphalts in this patent, and in order to gain TLA's and VLA's goodwill, the processed asphalts, when used, must not have any additive as a part of the final road-paving mix, thus ensuring that processed asphalts would be the same material as the refined asphalts, hereby acting and performing as well as the refined asphalts.

9. Another Attempt to Produce Pelletized TLA

There have been attempts (by others) to form pellets from TLA. In one attempt, the water-content of the TNA is first removed (Section 3 Item 7) to form the (refined) TLA. Pellets of TLA are then formed using a pelletized machine, and these are then coated with a powder (some percentage of the total weight) to cover the pellets so that coalescing would not occur. The pellets are then packaged in fabric bags. This process does not change the TLA's characteristics of flowing and coalescing, and the mineral matter in the TLA still sediments. However, by using small pellets, the flowing problem with TLA is minimized so that the TLA could be handled and used. The coalescent problem is solved by coating the pellets of the TLA with the powder. Finally, by conveying the pellets of TLA directly to the drum/pug-mill in conventional road-paving equipment, there would be no need to separately blend the TLA with the refinery bitumen, so that TLA's sedimenting problem would not occur.

However, the coalescent problem returns if or when the powder falls off the pellets during transport, storage and usage. As the powder used to coat the pellets is not removed prior to the TLA being used in the road-paving mix, the powder therefore forms a part of the final road-paving mix. Therefore, the powder-coated TLA used in the mix is not 100% pure TLA. The powder-coated TLA consequently cannot gain the decades of TLA's goodwill, especially since the powder-coated TLA do not have a performance record like the kegged TLA.

10. Previous Technologies

There are other technologies which addressed some of the problems detailed in Section 3 Items 5 and 6 above by using TNA as the starting base product. In these technologies:

(a) Stabilizers (such as clay or silica or others) are mixed with the natural asphalt (i.e. the TNA) using high shear mixers which do not add heat in the action, thereby increasing the melting point of the material;

(b) Elevated temperatures up to and between 160 and 200° C. are reached during the processing; and (c) Other stabilizers are sometimes also used with reactions to increase the surface tension around the pellets of TLA, so that the pellets do not coalesce; and (d) The powders and pellets of TLA do not coalesce, are packaged in plastic bags, and could be conveyed directly to the drum/pug-mill in conventional road-paving equipment.

However, as stabilizers are used to produce the powders and pellets of TLA, this processed TLA is not the same material as TLA (i.e. not 100% pure TLA), and therefore lose the decades of goodwill with TLA as a road-paving material, especially since the powders and pellets of TLA do not have a performance record like the kegged TLA.

11. The Solutions

TLA is a proven modifier, increasing the performance of refinery bitumen as a road-paving material for many decades. Likewise, the same is true of VLA for a few decades, and of NLA for a lesser duration.

However, natural and refined asphalts have problems of flowing, coalescing (i.e. packaging), and using (i.e. requiring specialized equipment), etc., thus making these asphalts not as cost effective as the other modifiers.

As a result, many attempts have been made to solve the above problems by marrying these natural or refined asphalts with additives (like a powder) and/or stabilizers (such as silica) which form part of the final road paving mix, therefore losing the decades of goodwill of successfully using TLA and VLA as modifiers for road-paving, and in many cases, the performance with the modifiers has been adversely affected by using these additives and stabilizers.

The solutions addressed in this patent are therefore as follows:

Either to simply package the natural or refined asphalts in smaller discrete elements without any additive, so that these elements, in pellet form, could be used on conventional road-paving equipment—the flowing problem would be minimized, the coalescing problem would be removed, and the sedimenting problem would no longer occur;

Or using water as the only additive, form powders or pellets of the natural and refined asphalts, covered these with surface water, and use the processed asphalts on conventional road-paving equipment, so that when used, the surface water and water content would not be a part of the final road-paving mix—the flowing problem would be minimized, the coalescing problem would be removed, and the sedimenting problem would no longer occur;

Or using water as the only additive, by actually processing the natural or refined asphalts so that the characteristics of these asphalts would be changed, the discrete elements do not flow or coalesce, the sedimentation rate of the mineral matters when blended with refinery bitumen are reduced, the processed asphalts could be used on conventional road-paving equipment, and when used, any surface water or water content present would not be a part of the final road-paving mix—then both the flowing and coalescing problems would be solved, and the sedimenting problem would be either minimized, or would no longer occurs.

In all these solutions above, the processed asphalts would be packaged in paper or plastic or fabric bags in various sizes, usually between 10 kg and 1000 kg, when used, would be a 100% pure version of the refined asphalt (i.e. devoid of additives), and the performances of the processed asphalts would be at least as well as the refined asphalts.

12. Statement of the Field of Endeavor

Three new methods to process natural asphalts, like those found in the deposits at La Brea, Trinidad, West Indies, or at Guanoco, Sucre State, Venezuela, or elsewhere in the world, producing powders or pellets which do not coalesce, could be used with conventional road-paving equipment, the additive (i.e. only water, if and when used) is not used in the final road-paving mix, the processed asphalts perform at least as well as the refined asphalt, is cost-effective, and gains the decades of goodwill of successfully using TLA or VLA or NLA as a road-paving modifier.

BRIEF SUMMARY OF THE INVENTION

1. Statement of the Object of the Invention

This patent covers the following:

(a) All methods of packaging natural and refined asphalts in plastic bags, without using any additive;

(b) All methods of using only water as the additive to stop the coalescing of the discrete elements of natural and refined asphalts; and (c) All methods to process natural and refined asphalts using only water as the additive.

All the processed asphalts produced by methods (a), (b) and (c) above are then packaged, and used with conventional road-paving equipment. When used, no additive (i.e. water) is used in the final road-paving mix, and the mix performs at least as well as the refined asphalts.

2. The Three Methods

This patent details three methods to process natural and refined asphalts, solving the problems associated with the natural and refined asphalts' thermoplastic and coalescent nature. These methods produce processed asphalts which are user-friendly and cost-effective.

Section 3 Items 5 and 6 details the problems of transporting, storing, handling and using natural and refined asphalts which are thermoplastic and coalescent in nature.

Section 3 Item 7 shows how TLA or VLA is presently produced, giving a flowchart of its production and use.

(a) Method One: Packaging Only.

In this method, the natural or refined asphalt is used as the base product.

This method is as follows:

Option One: The natural asphalt, with its water content, is mined, and then crushed/extruded/pelletized/and others ways of making smaller pieces (hereby all options are called 'crushed') into pellets of smaller sizes, or Option Two: after the refined asphalt is produced by removing the water content of the natural asphalt using high-pressure steam at 163° C. (Section 3 Item 7), the refined asphalt is then crushed/extruded/pelletized/and others ways of making smaller pieces (hereby all options are called 'crushed') into pellets of smaller sizes;

(ii) The size of the pellets would vary, about 0.5 kg or larger;

(iii) The pellets are then packaged in plastic bags so that the pellets would not coalesce;

(iv) No additive is used;

(v) The processed asphalts from Option One (i.e. pTNA or pVNA or pNNA), or Option Two (i.e. pTLA or pVLA or pNLA) are then be re-packaged in larger plastic or fabric bags of various sizes up to 1000 kg;

(vi) When the larger bags arrive on site, the processed asphalts are then transported via conveyor belts directly to the drum/pug-mill on conventional road-paving equipment, where the aggregates are being dried;

(vii) The water content in Option One would then be removed during the process of drying the aggregates (drum/pug-mill temperatures are higher than 100° C.). After the drying process (processed asphalt pellets and aggregates), the bitumen is then pumped to the drum/pug-mill;

(viii) The plastic bags do not adversely affect the performance of the final road-paving mix; and (ix) The processed asphalts could then be used without any environmental problems to dispose of the packaging, and without any extra on-site specialized tanks with stirrers.

The flowchart to produce and use the processed asphalt (i.e. Option One (pTNA or pVNA or pNNA), or Option Two (pTLA or pVLA or pNLA)) is therefore as follows:

Mining and/or refining→crushing→packaging→used with conventional road-paving equipment.

The stages from (i) to (ix) above could be repeated with other natural asphalts available worldwide which are thermoplastic and coalescent in nature, to produce powders and pellets of pNNA which are of the same material as NLA, and when used, act as the same material as NLA, performing just as well.

(b) Method Two: Packaging with Surface Water.

In this method, the natural or refined asphalt is used as the base product.

This method is as follows:

(i) Option One: The natural asphalt, with its water content, is mined, and then crushed/extruded/pelletized/and others ways of making smaller pieces (hereby all options are called 'crushed') into discrete elements, or Option Two: after the refined asphalt is produced by removing the water content of the natural asphalt using high-pressure steam at 163° C. (Section 3 Item 7), the refined asphalt is then crushed/extruded/pelletized/and others ways of making smaller pieces (hereby all options are called 'crushed') into discrete elements.

The smaller the size of the discrete element, the easier the ability to handle and use the packaged elements. Therefore these discrete elements in Option One or Two must be small enough so that when these elements are later packaged, the flowing of the elements would not affect handling and usage. The sizes of these elements should be about 0.25 kg or smaller;

(ii) The discrete elements would then be either soaked in water in low tanks containing no air bubbles, or sprayed with water on a conveyor belt, or other processes to soak the discrete elements with the water (hereby all options are called 'soaked'), so that the elements are fully covered with water. The timeframe would be determined mainly by the size of the discrete elements, and the other conditions of the soak (water pressure, etc.);

(iii) The remaining water is then drained and stored for re-use;

(iv) The pellets are then packaged with the surface water in sealed plastic bags of various sizes, usually up to 45 kg;

(v) No heat is used during this process;

(vi) The processed asphalts (i.e. Option One (pTNA or pVNA or pNNA), or Option Two (pTLA or pVLA or pNLA)), together with the plastic bags, are then be used on conventional road-paving equipment, transporting the bags of pellets via conveyor belts directly to the drum/pug-mill where the surface water (Options One and Two) and the water content (Option One only) are removed during the process of drying the aggregates; (vii) The plastic bags do not adversely affect the performance of the final road-paving mix;

(viii) The processed asphalts could then be used without any environmental problems to dispose of the packaging, and without any extra on-site specialized tanks with stirrers; and (ix) The only additive used is the surface water, but this is not used in the final road-paving mix.

The flowchart to produce and use the processed asphalt (i.e. Option One (pTNA or pVNA or pNNA), or Option Two (pTLA or pVLA or pNLA)) is therefore as follows:

Mining and/or refining→crushing→soaking→remaining water drained for re-use→packaging→used with conventional road-paving equipment.

The stages from (i) to (ix) above could be repeated with other natural asphalts available worldwide which are thermoplastic and coalescent in nature, to produce powders and pellets of pNNA which are of the same material as NLA, and when used, act as the same material as NLA, performing just as well.

(c) Method Three: Processing with Water and Packaged.

In this method, the natural and refined asphalts are used as the base product.

This method is as follows:

(i) Option One: The natural asphalt, with its water content, is mined, and then crushed/extruded/pelletized/and others ways of making smaller pieces (hereby all options are called 'crushed') into discrete elements of sizes, or Option Two: after the refined asphalt is produced by removing the water content of the natural asphalt using high-pressure steam at 163° C. (Section 3 Item 7), the refined asphalt is then crushed/extruded/pelletized/and others ways of making smaller pieces (hereby all options are called 'crushed') into discrete elements of sizes;

(ii) Water is added to the discrete elements, the combination is then mixed in a variable speed blender/pulverizer/mill/or other machines which causes mixing (hereby all options are called 'blender'), and with no heat. Pellets are produced at lower speeds of the blender, and powders are produced at higher speeds. The timeframe of the blending would be mainly determined by the asphalt to water ratio, and the required size of the final discrete element;

(iii) After the completion of this process, the water, which was added and used in the process, is then drained and stored for re-use;

(iv) The resulting processed asphalt (i.e. Option One (pTNA or pVNA or pNNA), or Option Two (pTLA or pVLA or pNLA)) is then either dried with hot air at temperatures between 50° C. and 60° C., or allowed to dry in the atmosphere, or left with surface moisture;

(v) Option Three—Dried: the powders or pellets of the processed asphalts are then packaged in paper or plastic or fabric bags of various sizes (usually from 10 kg to 1000 kg). The processed asphalts (i.e. pTLA or pVLA or pNLA) are then used on conventional road-paving equipment, transporting the content of the bags via conveyor belts either directly to the drum/pug-mill for mixing with the refinery bitumen, or to the blending tank where the refinery bitumen and modifier are blended, and then pumped to the drum/pug-mill for mixing, or Option Four—With water surface: the pellets of processed asphalts are packaged in plastic bags of various sizes (could be upward to 45 kg). The processed asphalts (i.e. Option One (pTNA or pVNA or pNNA), or Option Two (pTLA or pVLA or pNLA)) are then used on conventional road-paving equipment, transporting the bags of pellets via conveyor belts directly to the drum/pug-mill where both the surface water in Options Four, and the water content in Option One, are removed during the process of drying the aggregates;

(vi) The only additive used is therefore the added water, and this is either drained or removed by drying (directly or atmosphere or drum/pug-mill)—so no additive is used in the final road-paving mix;

(vii) The plastic bags do not adversely affect the performance of the final road-paving mix;

(viii) These processed asphalts could be used to produce both hot or cold mixes for road-paving; and (ix) The processed asphalts could then be used without any environmental problems to dispose of the packaging, and without any extra on-site specialized tanks with stirrers.

The flowchart to produce and use of the processed asphalts (i.e. Option One (pTNA or pVNA or pNNA), or Option Two (pTLA or pVLA or pNLA)) are therefore as follows:

Mining and/or refining→adding water→blending→remaining water drained for re-use→dried/not dried→packaging→used with conventional road-paving equipment.

The stages from (i) to (ix) above could be repeated with other natural asphalts available worldwide (thermoplastic and coalescent in nature), to produce powders and pellets of pNLA which are of the same material as NLA, and have the similar characteristics of pTLA or pVLA, performing just as well.

BRIEF DESCRIPTION OF THE SEVERAL VIEWS OF THE DRAWING

Not Applicable.

DETAILED DESCRIPTION OF THE INVENTION

1. The Three Methods.

(a) Method One: Packaging only.

Section 4 Item 2(a) shows the flowchart of how these processed asphalts are produced and used.

The process is detailed in Section 4 Item 2 (a).

In this Option One, the natural asphalt, with its water content, is crushed to discrete elements.

In this Option Two, after the refined asphalt has been produced from the natural asphalts (Section 3 Item 7), the refined asphalt is then crushed to discrete elements.

The discrete elements in Options One and Two must be so small enough so that the elements could be transported via the conveyor belts directly to the drum/pug-mill on conventional road-paving equipment. These sizes could be about 0.5 kg or larger.

These pellets are then packaged in plastic bags.

No heat is used in the process, and there is no temperature increase during the processing.

No additive is used, not even water.

The processed asphalts are then re-packaged in larger plastic or fabric bags of various sizes up to 1000 kg.

When the larger bags arrive on site, the processed asphalts are then conveyed directly to the drum/pug-mill in conventional road-paving equipment, where the water content (if present) would be dried along with the process of drying the aggregates. Since there would be no need of a separate blending with refinery bitumen, the sedimenting problem would no longer occur.

The new pellets of pTNA and pVNA and pNNA are of the same material as TNA and VNA and NNA respectively, and when the water content in the pTNA or pVNA or pNNA is remove during the process of drying the aggregates, pTNA or pVNA or pNNA becomes the same material as TLA and VLA and NLA respectively, and therefore acts and performs just as well.

Similarly, the pTLA or pVLA or pVLA is the same material as TLA or VLA or NLA respectively, and acts and performs just as well.

The processed asphalts are user-friendly, cost-effective to the end-user, and the decades of goodwill of successfully using TLA and VLA as a road-paving material could be gained by these pellets produced and used with this new method.

(b) Method Two: Packaging with Surface Water.

Section 4 Item 2(b) shows the flowchart of how this processed asphalts are produced and used.

The process of Method Two is detailed in Section 4 Item 2 (b).

In this method, the natural or refined asphalts are crushed to discrete elements and then soaked with water under defined conditions, and then packaged with the surface water in sealed plastic bags of various sizes, usually up to 45 kg.

The smaller the size of the discrete element, the easier the ability to handle and use the packaged processed asphalt. There is no attempt in this process to change the characteristics of the processed asphalts, and these pellets are still thermoplastic and therefore can flow. Consequently, the discrete elements of the natural or refined asphalt must be crushed to smaller sizes to minimize the actions of any flowing, so that the processed asphalts, when packaged, could still be handled and used. These elements should be about 0.25 kg or smaller.

The only additive is the surface water on the pellets.

The pellets of processed asphalts produced in this method (i.e. Option One (pTNA or pVNA or pNNA), or Option Two (pTLA or pVLA or pNLA)), do not coalesce. Further, as the pellets are introduced to drum/pug-mill where the aggregates are being dried, the surface water and the water content of the pTNA or pVNA or pNNA, or the surface water on the pTLA or pVLA or pNLA, are dried. Therefore, no additives are used in the final road-paving mix. Moreover, when used, and as the surface water and the water content (if present) having been dried prior to the mix, all these processed asphalt acts and perform in the same manner as TLA or VLA or NLA respectively, thereby gaining the decades of goodwill of successfully using these refined asphalts as a road-paving material.

As the pellets are transported via conveyor belts directly to the drum/pug-mill, the sedimenting problem does not occur.

No attempt is made in this process to change the nature of the natural or refined asphalts, and these pellets still flow (minimized by using smaller sizes), the coalescing is solved, and the mineral matters still sediment when blended with refinery bitumen (but this blending is no longer necessary).

(c) Method Three: Processing with Water and Packaged.

Section 4 Item 2(c) shows the flowchart of how these processed asphalts are produced and used.

The process is detailed in Section 4 Item 2 (c).

In this method, only water as an additive is added to the crushed natural or refined asphalt, and the resulting combination is then mixed using a variable speed blender, without added heat, to produce powders or pellets. Pellets are produced at the lower speeds of the blender, and powders are produced at the higher speeds, and the blending time determines both forms (i.e. low blender speeds with longer blending times result in the formation of powders). The temperature during the process increases up to about 10° C. After the blending, the added water is drained and stored for re-use. The resulting processed asphalt of pTNA or pVNA or pNNA, or pTLA or pVLA or pNLA is then either dried with hot air at temperatures between 50 and 60° C., or allowed to dry in the atmosphere, or left with the surface moisture. The dried processed asphalt is then packaged in paper or plastic or fabric bags usually from 10 kg to 1000 kg, and the pellets with surface water is packaged in plastic bags only, usually up to 45 kg. When packaged in plastic bags, the pellets and the plastic bags could be conveyed directly to the drum/pug-mill, as the plastic bags do not adversely affect the performance of the modifier.

The dried processed asphalts (Option Three) are then used on conventional road-paving equipment, transporting the pellets via conveyor belts either directly to the drum/pug-mill (pellets only) for mixing or to the blending tank (pellets or powder) where the refinery bitumen and modifier could be blended, and the resulting blend is then pumped to the drum/pug-mill for mixing.

The pellets of the processed asphalts with surface water (Option Four) are then conveyed directly to the drum/pug-mill where the aggregates are being dried. The surface water (Option Four) and the water content (Option One) are dried at the same time the aggregates are also being dried. The bitumen is then introduced to the drum/pug-mill to produce the hot-mixes for road-paving. The additive is therefore not use in the final road-paving mix.

Added water is the only additive in the process, and this is either removed by draining, or by drying (hot air, atmosphere, or in the drum/pug-mill). Therefore, no additive is used in the final road-paving fix.

Further, the actions of the process change the characteristics of the natural and refined asphalts, resulting in powders and pellets which have more user-friendly characteristics than those of the natural or refined asphalts, in that these powders and pellets do not flow or coalesce. Also, the rate of sedimentation of the mineral matter in the processed asphalt when blended with refinery bitumen is significantly lower than the rate of sedimentation when the refined asphalts are blended with refinery bitumen, thereby allowing, when necessary, to have the dry processed asphalts separately blended with the refinery bitumen on conventional equipment, as the window for use is significantly longer than the four hours allowed with TLA or VLA when used on specialized heated tanks with stirrers.

Since this process uses no additives except water, pTNA or pVNA or pNNA produced from Options One with Four), or pTLA or pVLA or pNLA (produced from Options One or Two with Three) (Section 4 Item 2(c)), when used, are all the same material as the TLA or VLA or NLA, as any surface water or water content present on/in these pellets would be removed during the drying process in the drum/pug-mill prior the final road-paving mix. In addition, the blends of the processed asphalts with refinery bitumen perform as well as, and sometimes better than, similar blends with the TLA or VLA or NLA respectively. This shows that the powders and pellets products by this new method performs as well as the kegged or barreled products produced for decades by the original method (Section 3 Item 7), and pTLA or pVLA or pNLA is easier to handle and use, and is more cost-effective. The decades of goodwill of successfully using TLA and VLA as a road-paving material could therefore be transferred to the powders and pellets produced with this new method.

In the dried powdered form, the pTLA or pVLA or pNLA could also be used to produce the non-paving options, like as a base for coatings, epoxies, chip-board, etc.

(2) The Differences and Improvements.

The Methods detailed in this patent are new in that, amongst others:

(a) Section 3 Item 9 shows an attempt by others to form pellets which do not coalesce. In this attempt, the water content of the natural asphalt of TNA is removed to form a refined asphalt of TLA which is packaged in bulk-form in kegs and barrels, each carrying 250 kg, making it a hazard to handle, an environment problem to discard the containers, and with the same user-unfriendly characteristics (coalescing, cannot be used on conventional equipment, etc.). However, in all the Methods in this patent, the processed asphalts are user-friendly (no coalescing, used on conventional equipment), are packaged in paper or paper or fabric bags of various sizes (between 10 kg and 1000 kg), and easier to handle. The plastics could be thrown with the pellets into the drum/pug-mill in the conventional equipment, and the paper and fabric bags form no environmental problem to discard.

(b) In this attempt by others, a powder is used to stop the pellets of TLA from coalescing, and if or when the powder falls off the pellets during transport, storage or handling, the coalescent problem re-occurs. Further, the powder used to coat the pellets forms a part of the final road-paving mix. Therefore, the powder-coated TLA used is not the same material as TLA, thereby losing the decades of goodwill of TLA as a modifier for road-paving.

However, in Method Two, surface water is used to stop the pellets from coalescing, and when the processed asphalts are used, the surface water is removed in the drum/pug-mill, so that the additive (i.e. surface water) forms no part of the final road-paving mix.

(c) Section 3 Item 10 shows an attempt by others to form pellets which do not coalesce. This attempt is different from Method Three in this patent in that, in Method Three: (i) no high shear mixer is required to reduce the temperature of the action but it is rather the added water which reduces the friction to lower the temperature of the mixture, (ii) the equipment used in this process is a variable speed blender, (iii) the temperature of the TNA with water does not go up to between 160 to 200° C., but only goes up by about 10° C., showing that in Method Three, the process is not temperature dependent, (iv) no stabilizers (like clay or silica or others) are used to increase the melting point, and (v) no stabilizers form a part of the final road-paving mix. In all these Methods in this patent, the additive used (i.e. water) does not form a part of the final road-paving mix, and the pTLA or pVLA or pNLA are respectively the same materials as TLA or VLA or NLA, without any stabilizers.

(d) In method Three, the rate of the sedimentation of the mineral matters in the powders and pellets of pTLA or pVLA or pNLA when blended with refinery bitumen is slowed that the corresponding rates of sedimentation with TLA or VLA or NLA when blended with refinery bitumen.

(e) In order to use refined asphalts in other processes, specialized heated tanks with stirrers are required on-site, but in all these Methods, the pellets and powders produced could be used with conventional road-paving equipment.

(f) The powdered pTLA or pVLA or pNLA formed in Method Three could be used for non-paving options.

(g) In Method One, no additive, not even water, is used.

In Method Two, water is added to the crushed natural or refined asphalts to surround the pellets, and no chemical reaction takes place.

In Method Three, it is the action of the process which changes the characteristics of the natural asphalt, and not any secondary action, as is done by others (see Section 3 Item 10); and (h) This process applies to all natural asphalts, including TNA and VNA and NNA, which have thermoplastic and coalescent characteristics

The invention claimed is:

1. An asphaltic road paving product made by the process comprising:

obtaining Trinidad natural asphalt or refined Trinidad lake asphalt, disposing said asphalt into a vessel and mixing said asphalt with 2-3% by weight of water to form discrete pellets having a size between 1-10 mm; stabilizing said discrete pellets by removing water from said discrete pellets by subjecting said discrete pellets to air at a temperature between 50-100° C. for 3-5 minutes to minimize the loss of maltene-content in the asphalt resulting in providing a non-flowing and non-coalescing pellets which contain no additives.

2. An asphaltic road paving product made by the process comprising:

obtaining Trinidad natural asphalt or refined Trinidad lake asphalt, disposing said asphalt into a vessel and mixing said asphalt with 2-3% by weight of water to form discrete powders having a size between 20 microns to 1 mm; stabilizing said discrete pellets by removing water from said discrete pellets by subjecting said discrete powders to air at a temperature between 40-60° C. for 1-2 minutes to minimize the loss of maltene-content in the asphalt resulting in providing a non-flowing and non-coalescing powders which contain no additives.

* * * * *